United States Patent
Tanaka et al.

(10) Patent No.: US 11,452,963 B2
(45) Date of Patent: Sep. 27, 2022

(54) DUST COLLECTOR

(71) Applicant: SEIKO EPSON CORPORATION, Tokyo (JP)

(72) Inventors: Hiroshi Tanaka, Nagano (JP); Shigeo Fujita, Nagano (JP); Minoru Honjo, Nagano (JP); Hidetoshi Hashizume, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 295 days.

(21) Appl. No.: 16/827,765

(22) Filed: Mar. 24, 2020

(65) Prior Publication Data
US 2020/0306679 A1  Oct. 1, 2020

(30) Foreign Application Priority Data

Mar. 26, 2019 (JP) .............................. JP2019-057663

(51) Int. Cl.
  *B01D 46/02* (2006.01)
  *B01D 46/00* (2022.01)
  *B01D 46/76* (2022.01)

(52) U.S. Cl.
  CPC ......... *B01D 46/02* (2013.01); *B01D 46/0053* (2013.01); *B01D 46/76* (2022.01)

(58) Field of Classification Search
  CPC ..... B01D 46/02; B01D 46/0053; B01D 46/76
  See application file for complete search history.

(56) References Cited

U.S. PATENT DOCUMENTS

| | | | | |
|---|---|---|---|---|
| 2,014,298 A | * | 9/1935 | Schneible | B01D 46/60 55/378 |
| 2,932,362 A | * | 4/1960 | Roper | F24F 13/28 55/304 |
| 3,041,808 A | * | 7/1962 | Snyder | B01D 39/086 55/304 |
| 3,572,012 A | * | 3/1971 | Martin | F24F 13/28 55/304 |
| 3,577,705 A | * | 5/1971 | Sharlit | B01D 46/70 55/300 |
| 3,955,947 A | * | 5/1976 | Hoon | B01D 46/76 55/300 |
| 3,966,434 A | * | 6/1976 | Frazier | B01D 46/76 95/286 |
| 4,067,708 A | * | 1/1978 | Bykhover | B01D 46/76 55/304 |

(Continued)

FOREIGN PATENT DOCUMENTS

| | | |
|---|---|---|
| JP | 2000-070194 A | 3/2000 |
| JP | 2006-095062 A | 4/2006 |

*Primary Examiner* — Robert Clemente
(74) *Attorney, Agent, or Firm* — Global IP Counselors, LLP

(57) ABSTRACT

A dust collector includes a housing, a dust collecting bag that is installed in the housing and has an air permeability, a supply section that has a pipe coupled to the dust collecting bag, and supplies a powder into the housing via the pipe, a negative pressure generating section that generates a negative pressure in the housing, and a vibration applying section that applies a vibration to the dust collecting bag. The dust collecting bag includes a top surface, a bottom surface, and a side surface coupling the top surface and the bottom surface with each other, and a vibration transmitted to the top surface is larger than a vibration transmitted to the bottom surface.

8 Claims, 6 Drawing Sheets

(56) References Cited

U.S. PATENT DOCUMENTS

| | | | | |
|---|---|---|---|---|
| 4,152,127 A | * | 5/1979 | Kennedy, Jr. | B01D 46/04 55/304 |
| 4,199,334 A | * | 4/1980 | Berkhoel | B01D 46/2411 55/497 |
| 4,242,114 A | * | 12/1980 | Deacon | B01D 46/04 55/304 |
| 4,283,208 A | * | 8/1981 | Fernando | B01D 46/76 55/304 |
| 5,223,005 A | * | 6/1993 | Avondoglio | B01D 46/2411 55/300 |
| 2009/0025348 A1 | * | 1/2009 | Cheng | B01D 45/02 55/385.1 |

\* cited by examiner

DUST COLLECTOR

The present application is based on, and claims priority from JP Application Serial Number 2019-057663, filed Mar. 26, 2019, the disclosure of which is hereby incorporated by reference herein in its entirety.

BACKGROUND

1. Technical Field

The present disclosure relates to a dust collector.

2. Related Art

In the related art, a dust collector that traps and collects powder such as dust is known. For example, a vacuum cleaner described in JP-A-2006-95062 includes a suction section, a paper pack that collects powder sucked by the suction section, and a vibration applying section that applies vibration to the paper pack. The vibration applying section applies vibration to the paper pack to reduce the occurrence of clogging due to the sticking of the dust on the inner surface of the paper pack.

However, in JP-A-2006-95062, since the vibration is applied by striking only a part of the paper pack, that is, one surface of the paper pack, the vibration is less likely to be transmitted to other surfaces of the paper pack, and there is a possibility that clogging may occur.

SUMMARY

The present disclosure can be realized in the following aspect.

According to an aspect of the present disclosure, there is provided a dust collector. The dust collector includes a housing, a dust collecting bag that is installed in the housing and has an air permeability, a supply section that has a pipe coupled to the dust collecting bag, and supplies a powder into the housing via the pipe, a negative pressure generating section that generates a negative pressure in the housing, and a vibration applying section that applies a vibration to the dust collecting bag. The dust collecting bag includes a top surface, a bottom surface, and a side surface coupling the top surface and the bottom surface with each other, and a vibration transmitted to the top surface is larger than a vibration transmitted to the bottom surface.

DESCRIPTION OF EXEMPLARY EMBODIMENTS

Hereinafter, a dust collector according to the present disclosure will be described in detail with reference to a preferred embodiment shown in the accompanying drawings.

Embodiment 1

Figure 1:
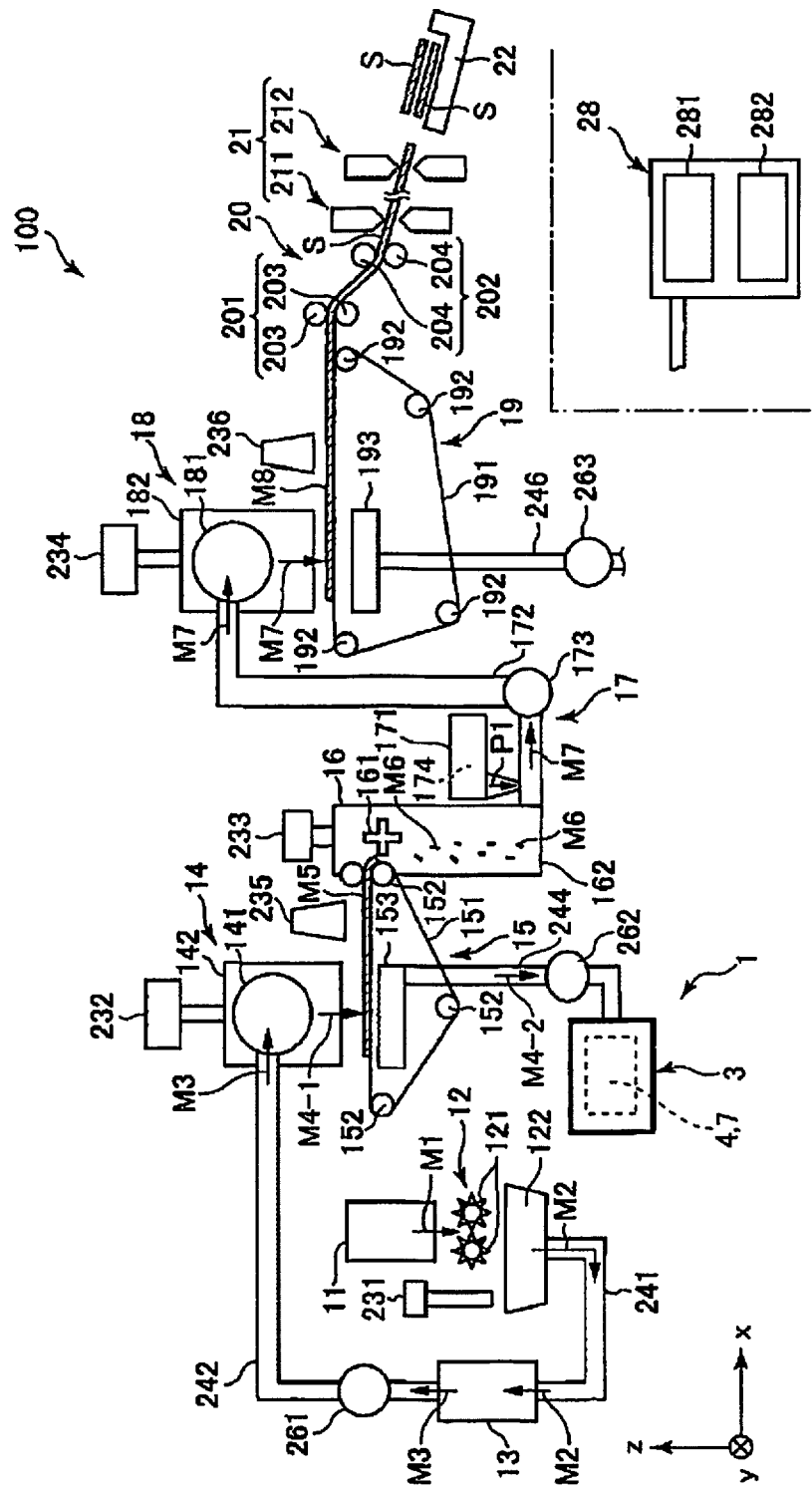
FIG. 1 is a schematic side view of a sheet manufacturing apparatus including a dust collector according to Embodiment 1 of the present disclosure.
Figure 2:
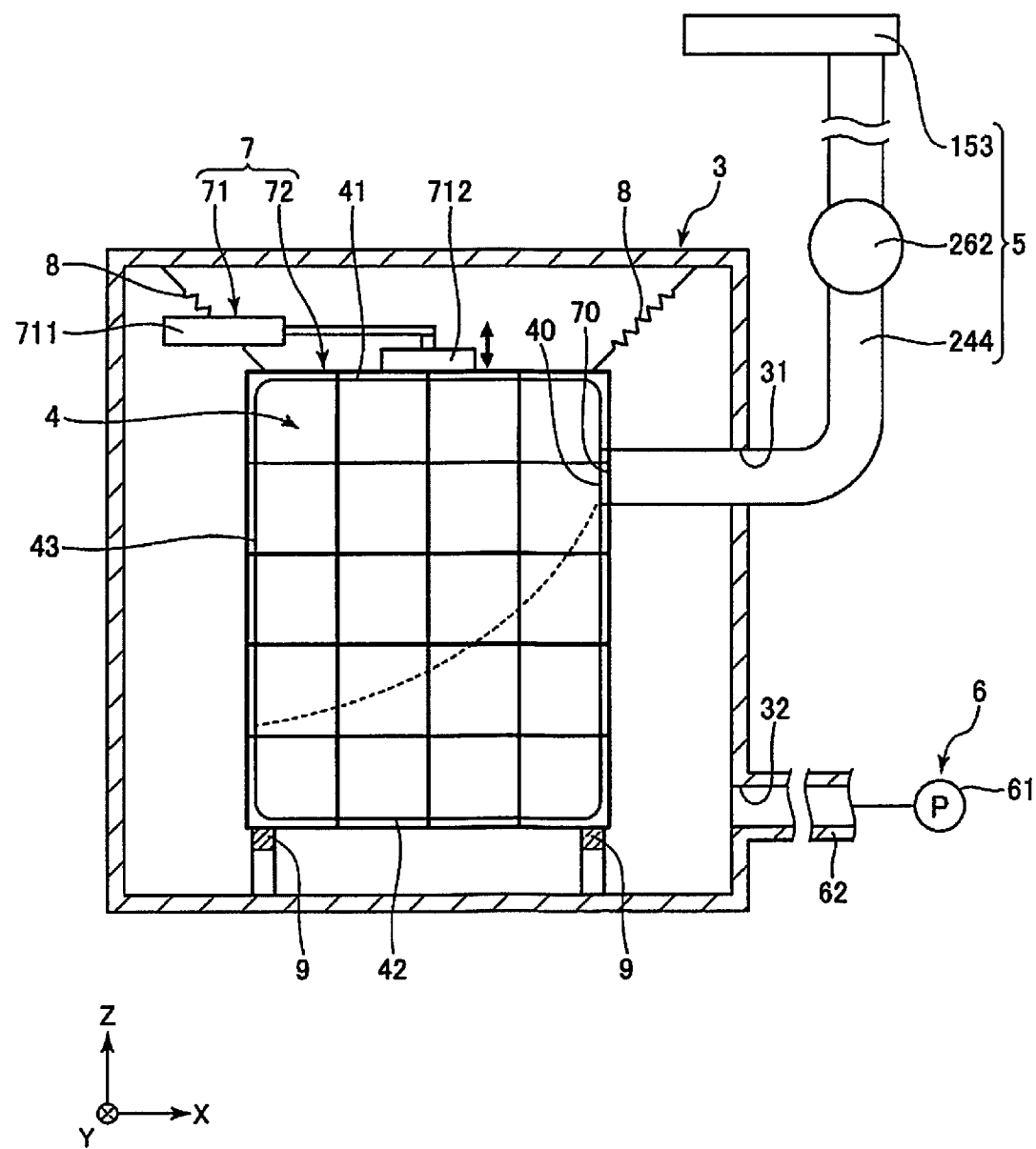
FIG. 2 is a sectional view of the dust collector shown in FIG. 1.
Figure 3:
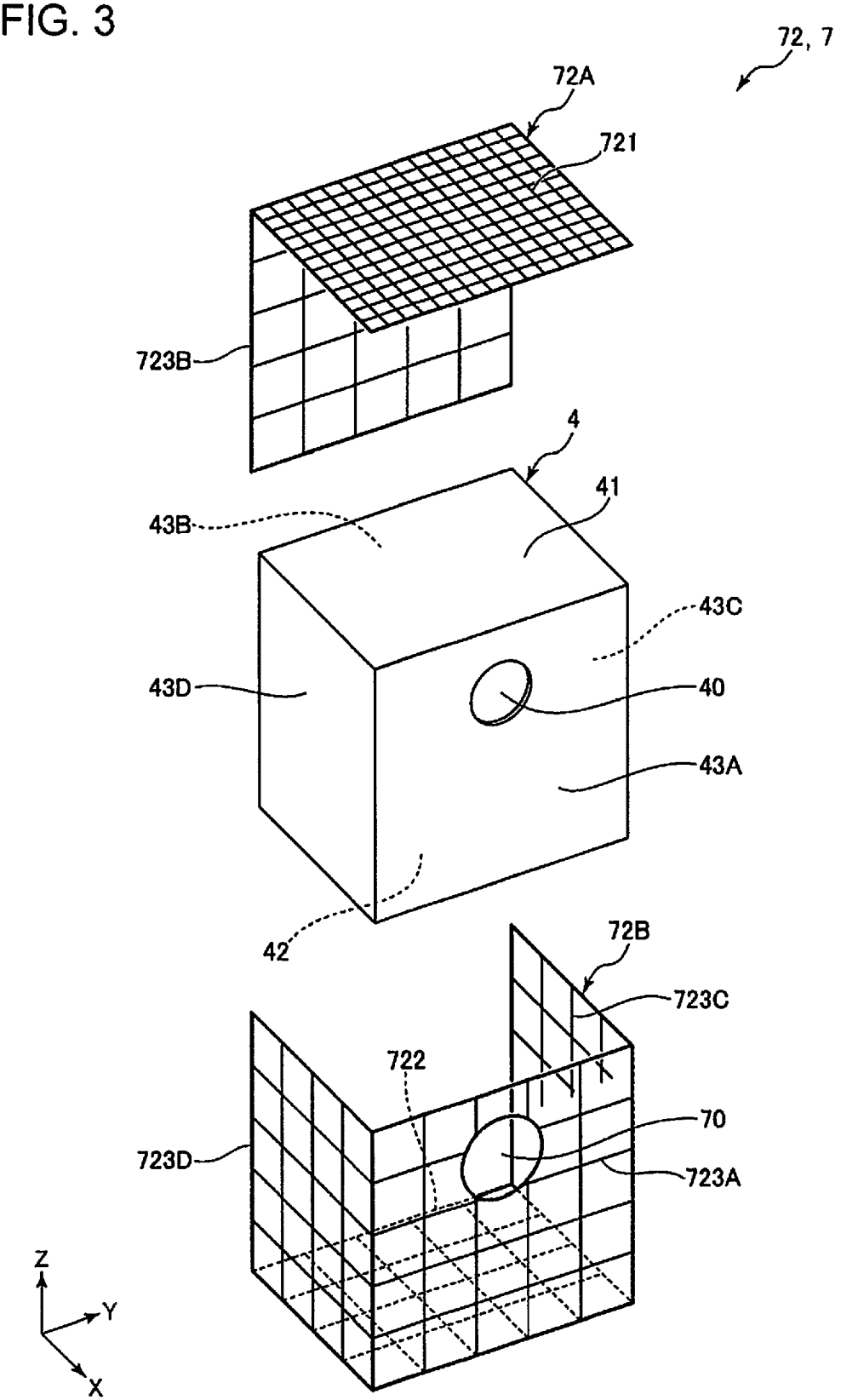
FIG. 3 is an exploded perspective view of a dust collecting bag and a vibration transmission member shown in FIG. 1.
Figure 4:
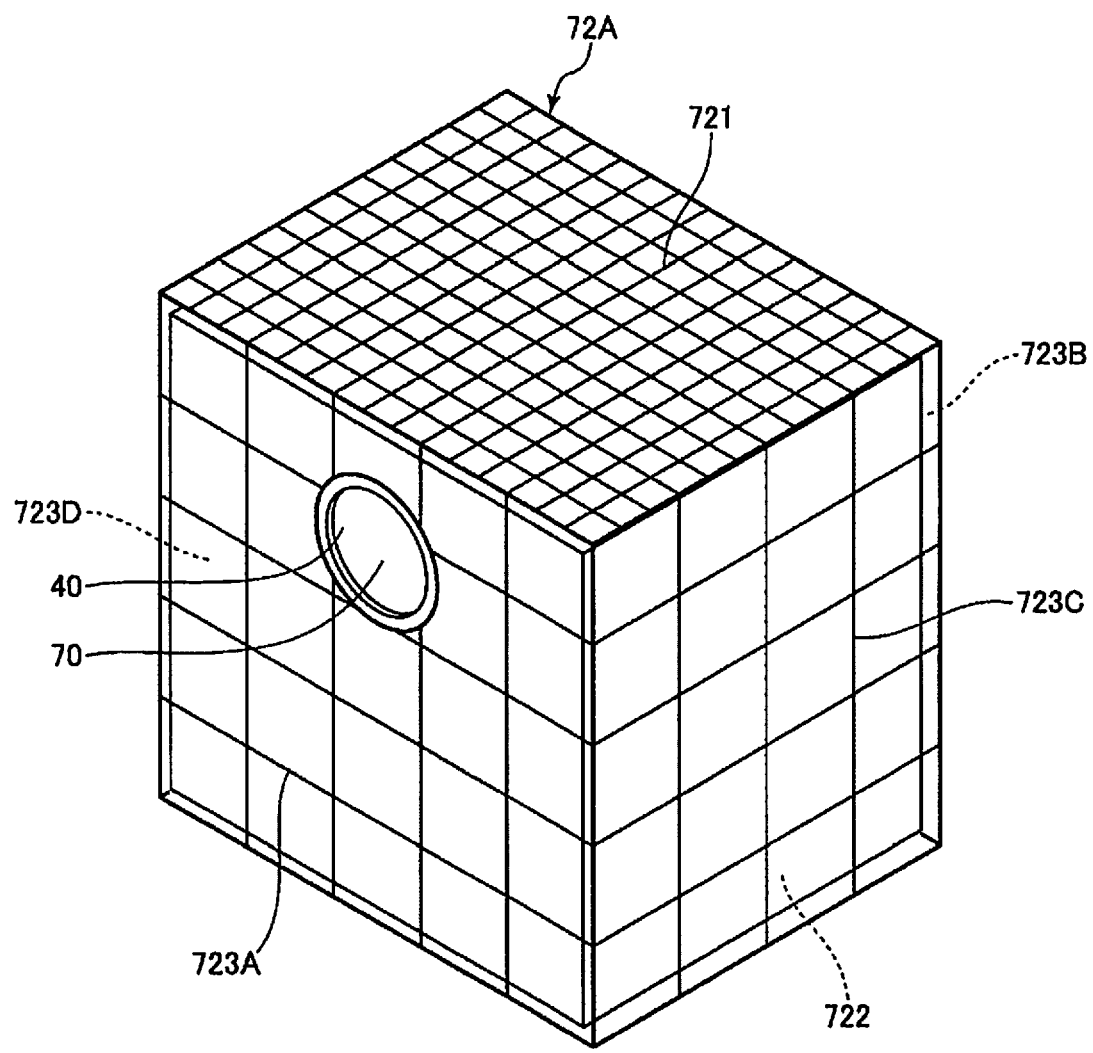
FIG. 4 is a perspective view of the vibration transmission member shown in FIG. 1.

FIG. 1 is a schematic side view of a sheet manufacturing apparatus including a dust collector according to Embodiment 1 of the present disclosure. FIG. 2 is a sectional view of the dust collector shown in FIG. 1. FIG. 3 is an exploded perspective view of a dust collecting bag and a vibration transmission member shown in FIG. 1. FIG. 4 is a perspective view of the vibration transmission member shown in FIG. 1.

In the following, for convenience of description, as shown in FIG. 1, three axes orthogonal to each other are referred to as an x axis, a y axis, and a z axis. Further, an xy plane including the x axis and the y axis is horizontal, and the z axis is the vertical direction. More specifically, the direction from a +Z axis direction to a −Z axis direction is along a gravity drop direction. The direction in which the arrow of each axis is directed is referred to as "+", and the opposite direction is referred to as "−". In FIG. 1, an upper side may be referred to as "up" or "above", and a lower side may be referred to as "down" or "below".

As shown in FIG. 1, a sheet manufacturing apparatus 100 includes a raw material supply section 11, a crushing section 12, a defibrating section 13, a sorting section 14, a first web forming section 15, a subdividing section 16, a mixing section 17, a loosening section 18, a second web forming section 19, a sheet forming section 20, a cutting section 21, a stock section 22, a dust collector 1 according to the present disclosure, and a controller 28. Further, each of the sections is electrically coupled to the controller 28, and the operation thereof is controlled by the controller 28.

Further, the sheet manufacturing apparatus 100 includes a humidifying section 231, a humidifying section 232, a humidifying section 233, a humidifying section 234, a humidifying section 235, and a humidifying section 236. In addition, the sheet manufacturing apparatus 100 includes a blower 261, a blower 262, and a blower 263.

Further, in the sheet manufacturing apparatus 100, a raw material supply process, a crushing process, a defibrating process, a sorting process, a first web forming process, a dividing process, a mixing process, a loosening process, a second web forming process, a sheet forming process, and a cutting process are executed in this order.

Hereinafter, the configuration of each section will be described.

The raw material supply section 11 performs the raw material supply process of supplying a raw material M1 to the crushing section 12. The raw material M1 is a sheet-like material which consists of a fiber-containing material containing a cellulose fiber. The cellulose fiber is not particularly limited as long as it is mainly composed of cellulose (narrowly defined cellulose) as a compound and is a fibrous material, and the cellulose fiber may contain hemicellulose and lignin in addition to cellulose (narrowly defined cellulose). Further, the raw material M1 may be in any form such as woven fabric or non-woven fabric. The raw material M1 may be, for example, recycled paper that is recycled and manufactured by defibrating used paper or YUPO paper (registered trademark) that is synthetic paper, or may not be recycled paper. In the present embodiment, the raw material M1 is used paper that has been used or that is no longer needed.

The crushing section 12 performs the crushing process of crushing the raw material M1 supplied from the raw material supply section 11 in the atmosphere or the like. The crushing section 12 has a pair of crushing blades 121 and a chute 122.

The pair of crushing blades 121 can rotate in mutually opposite directions to crush the raw material M1 between the crushing blades 121, that is, to cut the raw material to form a crushing piece M2. The crushing piece M2 may preferably have the shape and size suitable for defibrating processing in the defibrating section 13, and may preferably be, for example, a small piece having a side length of 100 mm or less, and more preferably, 10 mm or more and 70 mm or less.

The chute 122 is disposed below the pair of crushing blades 121 and has, for example, a funnel shape. Thereby, the chute 122 can receive the crushing piece M2 which is crushed by the crushing blade 121 and falls.

Further, the humidifying section 231 is disposed above the chute 122 so as to be adjacent to the pair of crushing blades 121. The humidifying section 231 humidifies the crushing piece M2 in the chute 122. The humidifying section 231 has a filter (not shown) containing moisture, and includes a vaporization type (or hot air vaporization type) humidifier that supplies humidified air with increased humidity to the crushing piece M2 by passing air through the filter. By supplying the humidified air to the crushing piece M2, it is possible to inhibit the crushing piece M2 from adhering to the chute 122 and the like due to static electricity.

The chute 122 is coupled to the defibrating section 13 via a pipe 241. The crushing piece M2 collected on the chute 122 passes through the pipe 241 and is transported to the defibrating section 13.

The defibrating section 13 performs the defibrating process of defibrating the crushing piece M2 in the air, that is, in a dry manner. By the defibrating processing in the defibrating section 13, a defibrated material M3 can be generated from the crushing piece M2. Here, "defibrating" means unraveling the crushing piece M2, formed by binding a plurality of fibers, into individual fibers. Then, the unraveled material is the defibrated material M3. The defibrated material M3 has a linear or band shape. Further, the defibrated material M3 may exist in a state where the defibrated material M3 is entangled and formed into a lump, that is, in a state of forming a so-called "ball".

In the present embodiment, for example, the defibrating section 13 includes an impeller mill having a rotary blade that rotates at a high speed and a liner that is located on the outer periphery of the rotary blade. The crushing piece M2 flowing into the defibrating section 13 is defibrated by being sandwiched between the rotary blade and the liner.

Further, the defibrating section 13 can generate a flow of air from the crushing section 12 toward the sorting section 14, that is, an air flow, by rotation of the rotary blade. Thereby, it is possible to suck the crushing piece M2 to the defibrating section 13 from the pipe 241. After the defibrating processing, the defibrated material M3 can be sent out to the sorting section 14 via the pipe 242.

The blower 261 is installed in the middle of the pipe 242. The blower 261 is an air flow generation device that generates an air flow toward the sorting section 14. Thereby, sending out the defibrated material M3 to the sorting section 14 is promoted.

The sorting section 14 performs the sorting process of sorting the defibrated material M3 according to the length of the fiber. In the sorting section 14, the defibrated material M3 is sorted into a first sorted material M4-1 and a second sorted material M4-2 that is larger than the first sorted material M4-1. The first sorted material M4-1 has a size suitable for the subsequent manufacture of the sheet S. The average length is preferably 1 µm or more and 30 µm or less. Meanwhile, the second sorted material M4-2 includes excessively short fibers that are not suitable for sheet manufacturing, and foreign matters such as coloring materials and dust.

The sorting section 14 includes a drum section 141 and a housing section 142 that houses the drum section 141.

The drum section 141 is a sieve that is formed of a cylindrical net body and that rotates around its central axis. The defibrated material M3 flows into the drum section 141. As the drum section 141 rotates, the defibrated material M3 smaller than the opening of the net is sorted as the first sorted material M4-1, and the defibrated material M3 having a size equal to or larger than the opening of the net is sorted as the second sorted material M4-2, sucked by the suction section 153, and collected by the dust collector 1. Hereinafter, the second sorted material M4-2 and foreign matters such as coloring materials are collectively referred to as "powder".

Further, the first sorted material M4-1 falls from the drum section 141 while being dispersed in the air, and travels to the first web forming section 15 located below the drum section 141. The first web forming section 15 performs the first web forming process of forming a first web M5 from the first sorted material M4-1. The first web forming section 15 has a mesh belt 151, three tension rollers 152, and a suction section 153.

The mesh belt 151 is an endless belt, and the first sorted material M4-1 is deposited thereon. The mesh belt 151 is wound around three tension rollers 152. When the tension rollers 152 are rotationally driven, the first sorted material M4-1 on the mesh belt 151 is transported toward downstream.

The first sorted material M4-1 has a size equal to or larger than the opening of the mesh belt 151. Thereby, the first sorted material M4-1 is restricted from passing through the mesh belt 151 and can thus be deposited on the mesh belt 151. Since the first sorted material M4-1 is transported toward downstream with the mesh belt 151 in a state where the first sorted material M4-1 is deposited on the mesh belt 151, the first sorted material M4-1 is formed as the layered first web M5.

Further, there is a possibility that dust, dirt, and the like are mixed in the first sorted material M4-1. Dust or dirt may be generated by crushing or defibrillation, for example. Such a powder as dust or dirt is collected by the dust collector 1 according to the present disclosure.

The suction section 153 is a suction mechanism that sucks air from below the mesh belt 151. Thereby, it is possible to suck the dust or dirt which has passed the mesh belt 151 with air.

The suction section 153 is coupled to the dust collector 1 via a pipe 244. The dust or dirt sucked by the suction section 153 is collected by the dust collector 1.

The blower 262 is installed in the middle of the pipe 244. By the operation of the blower 262, a suction force can be generated at the suction section 153. Thereby, formation of the first web M5 on the mesh belt 151 is promoted. The first web M5 is formed by removing dust, dirt and the like. Further, the dust or dirt passes through the pipe 244 and reaches the dust collector 1 by the operation of the blower 262. The configuration of the dust collector 1 will be described in detail later.

The housing section 142 is coupled to the humidifying section 232. The humidifying section 232 includes a vaporization type humidifier similar to the humidifying section 231. Thereby, the humidified air is supplied into the housing section 142. The first sorted material M4-1 can be humidified with the humidified air, so that the first sorted material M4-1 can be inhibited from adhering to the inner wall of the housing section 142 due to electrostatic force.

The humidifying section 235 is disposed downstream of the sorting section 14. The humidifying section 235 includes an ultrasonic humidifier that sprays water. Thereby, moisture can be supplied to the first web M5, and thus the content of moisture of the first web M5 is adjusted. By the adjustment, adsorption of the first web M5 to the mesh belt 151 due to electrostatic force can be inhibited. Thereby, the first web M5 easily peels off from the mesh belt 151 at a position where the mesh belt 151 is folded back by the tension rollers 152.

The subdividing section 16 is disposed downstream of the humidifying section 235. The subdividing section 16 performs the dividing process of dividing the first web M5 which has peeled off from the mesh belt 151. The subdividing section 16 has a propeller 161 that is rotatably supported and a housing section 162 that houses the propeller 161. Then, the first web M5 can be divided by the rotating propeller 161. The divided first web M5 becomes a subdivided body M6. Further, the subdivided body M6 descends in the housing section 162.

The housing section 162 is coupled to the humidifying section 233. The humidifying section 233 includes a vaporization type humidifier similar to the humidifying section 231. Thereby, the humidified air is supplied into the housing section 162. The humidified air can inhibit the subdivided body M6 from adhering to the propeller 161 or the inner wall of the housing section 162 due to electrostatic force.

The mixing section 17 is disposed downstream of the subdividing section 16. The mixing section 17 performs the mixing process of mixing the subdivided body M6 and a resin P1. The mixing section 17 has a resin supply section 171, a pipe 172, and a blower 173.

The pipe 172 couples the housing section 162 of the subdividing section 16 and a housing section 182 of the loosening section 18 to each other and is a flow path through which a mixture M7 of the subdivided body M6 and the resin P1 passes.

The resin supply section 171 is coupled to the pipe 172 in the middle thereof. The resin supply section 171 has a screw feeder 174. When the screw feeder 174 is rotationally driven, the resin P1 can be supplied to the pipe 172 as powder or particles. The resin P1 supplied to the pipe 172 is mixed with the subdivided body M6 to become the mixture M7.

The resin P1 is for binding the fibers in a later process, and for example, a thermoplastic resin, a curable resin, or the like can be used, but a thermoplastic resin is desirably used. Examples of the thermoplastic resin include an AS resin, an ABS resin, polyolefin such as polyethylene, polypropylene, or an ethylene-vinyl acetate copolymer (EVA), modified polyolefin, an acrylic resin such as polymethyl methacrylate, polyvinyl chloride, polystyrene, polyester such as polyethylene terephthalate and polybutylene terephthalate, polyamide (nylon) such as nylon 6, nylon 46, nylon 66, nylon 610, nylon 612, nylon 11, nylon 12, nylon 6-12, and nylon 6-66, polyphenylene ether, polyacetal, polyether, polyphenylene oxide, polyetheretherketone, polycarbonate, polyphenylene sulfide, thermoplastic polyimide, polyetherimide, a liquid crystal polymer such as aromatic polyester, various thermoplastic elastomers such as a styrene-based thermoplastic elastomer, a polyolefin-based thermoplastic elastomer, a polyvinyl chloride-based thermoplastic elastomer, a polyurethane-based thermoplastic elastomer, a polyester-based thermoplastic elastomer, a polyamide-based thermoplastic elastomer, a polybutadiene-based thermoplastic elastomer, a trans polyisoprene-based thermoplastic elastomer, a fluoro rubber-based thermoplastic elastomer, and a chlorinated polyethylene-based thermoplastic elastomer, and the like, and one or more selected from these can be used in combination. Desirably, as the thermoplastic resin, polyester or a composition containing the polyester is used.

In addition to the resin P1, a colorant for coloring the fiber, an aggregation inhibitor for inhibiting aggregation of the fiber or aggregation of the resin P1, a flame retardant for making the fiber difficult to burn, a paper strengthening agent for enhancing the paper strength of sheet S, and the like may be supplied from the resin supply section 171. Alternatively, the above-mentioned colorant, aggregation inhibitor, flame retardant, and paper strengthening agent may be contained and compounded in the resin P1 in advance, and then they may be supplied from the resin supply section 171.

In the middle of the pipe 172, the blower 173 is installed downstream of the resin supply section 171. The subdivided body M6 and the resin P1 are mixed by the action of a rotating portion such as a blade of the blower 173. Further, the blower 173 can generate an air flow toward the loosening section 18. With the air flow, the subdivided body M6 and the resin P1 can be stirred in the pipe 172. Thereby, the mixture M7 can flow into the loosening section 18 in a state where the subdivided body M6 and the resin P1 are uniformly dispersed. Further, the subdivided body M6 in the mixture M7 is loosened in the process of passing through the pipe 172, and becomes a finer fibrous material.

The loosening section 18 performs the loosening process of loosening the mutually entangled fibers in the mixture M7. The loosening section 18 includes a drum section 181 and the housing section 182 that houses the drum section 181.

The drum section 181 is a sieve that is formed of a cylindrical net body and that rotates around its central axis. The mixture M7 flows into the drum section 181. When the drum section 181 rotates, fibers or the like smaller than the opening of the net in the mixture M7 can pass through the drum section 181. At that time, the mixture M7 is loosened.

The housing section 182 is coupled to the humidifying section 234. The humidifying section 234 includes a vaporization type humidifier similar to the humidifying section 231. Thereby, the humidified air is supplied into the housing section 182. The inside of the housing section 182 can be humidified with the humidified air, so that the mixture M7 can be inhibited from adhering to the inner wall of the housing section 182 due to electrostatic force.

Further, the mixture M7 loosened in the drum section 181 falls while being dispersed in the air, and travels to the second web forming section 19 located below the drum section 181. The second web forming section 19 performs the second web forming process of forming a second web M8 from the mixture M7. The second web forming section 19 has a mesh belt 191, tension rollers 192, and a suction section 193.

The mesh belt 191 is an endless belt, and the mixture M7 is deposited thereon. The mesh belt 191 is wound around four tension rollers 192. When the tension rollers 192 are rotationally driven, the mixture M7 on the mesh belt 191 is transported toward downstream.

Further, most of the mixture M7 on the mesh belt 191 has a size equal to or larger than the opening of the mesh belt 191. Thereby, the mixture M7 is restricted from passing through the mesh belt 191 and can thus be deposited on the mesh belt 191. Since the mixture M7 is transported toward downstream with the mesh belt 191 in a state where the mixture is deposited on the mesh belt 191, the mixture M7 is formed as the layered second web M8.

The suction section 193 is a suction mechanism that sucks air from below the mesh belt 191. Thereby, the mixture M7 can be sucked onto the mesh belt 191, and thus the deposition of the mixture M7 onto the mesh belt 191 is promoted.

A pipe 246 is coupled to the suction section 193. Further, the blower 263 is installed in the middle of the pipe 246. By the operation of the blower 263, a suction force can be generated at the suction section 193.

The humidifying section 236 is disposed downstream of the loosening section 18. The humidifying section 236 includes an ultrasonic humidifier similar to the humidifying section 235. Thereby, moisture can be supplied to the second web M8, and thus the content of moisture of the second web M8 is adjusted. By the adjustment, adsorption of the second web M8 to the mesh belt 191 due to electrostatic force can be suppressed. Thereby, the second web M8 easily peels off from the mesh belt 191 at a position where the mesh belt 191 is folded back by the tension rollers 192.

The total content of moisture added from the humidifying section 231 to the humidifying section 236 is preferably 0.5 parts by mass or more and 20 parts by mass or less with respect to 100 parts by mass of the material before humidification, for example.

The sheet forming section 20 is disposed downstream of the second web forming section 19. The sheet forming section 20 performs the sheet forming process of forming the sheet S from the second web M8. The sheet forming section 20 has a pressurizing section 201 and a heating section 202.

The pressurizing section 201 has a pair of calender rollers 203 and can pressurize the web M8 between the calender rollers 203 without heating the second web M8. Thereby, the density of the second web M8 is increased. The second web M8 is transported toward the heating section 202. Note that, one of the pair of calender rollers 203 is a main driving roller which is driven by the operation of a motor (not shown), and the other is a driven roller.

The heating section 202 has a pair of heating rollers 204 and can pressurize the web M8 between the heating rollers 204 while heating the second web M8. By the heat and pressure, the resin P1 is melted in the second web M8, and the fibers are bound to each other via the melted resin P1. Thereby, the sheet S is formed. It is preferable the extent of the heating in this case is, for example, that the resin P1 is not melted. The sheet S is transported toward the cutting section 21. Note that, one of the pair of heating rollers 204 is a main driving roller which is driven by the operation of a motor (not shown), and the other is a driven roller.

The cutting section 21 is disposed downstream of the sheet forming section 20. The cutting section 21 performs the cutting process of cutting the sheet S. The cutting section 21 has a first cutter 211 and a second cutter 212.

The first cutter 211 cuts the sheet S in a direction that intersects with the transport direction of the sheet S, particularly in a direction orthogonal thereto.

The second cutter 212 cuts the sheet S in a direction parallel to the transport direction of the sheet S on the downstream of the first cutter 211. The cutting is a process of removing unnecessary portions at both end portions of the sheet S, that is, the end portions in the +y axis direction and the −y axis direction to adjust the width of the sheet S. In addition, the portion that has been removed by the cutting is referred to as a so-called "edge".

By the cutting performed with the first cutter 211 and the second cutter 212 as described above, the sheet S having a desired shape and size can be obtained. The sheet S is transported further downstream and accumulated in the stock section 22.

Each section included in such a sheet manufacturing apparatus 100 is electrically coupled to the controller 28. The operations of these sections are controlled by the controller 28.

The controller 28 has a central processing unit (CPU) 281 and a storage section 282. For example, the CPU 281 can make various determinations, various commands, and the like.

The storage section 282 stores various programs, such as a program for manufacturing the sheet S, various calibration curves, a table, and the like.

The controller 28 may be built in the sheet manufacturing apparatus 100 or may be provided in an external device such as an external computer. In some cases, the external device communicates with the sheet manufacturing apparatus 100 via a cable or the like, or wirelessly communicates therewith. For example, the external device is coupled to the sheet manufacturing apparatus 100 via a network such as the Internet.

Further, for example, the CPU 281 and the storage section 282 may be integrated as a single section, the CPU 281 may be built in the sheet manufacturing apparatus 100 and the storage section 282 may be provided in an external device such as an external computer, or the storage section 282 may be built in the sheet manufacturing apparatus 100 and the CPU 281 may be provided in an external device such as an external computer.

Next, the dust collector 1 will be described. As shown in FIG. 2, the dust collector 1 has a function of trapping and collecting the powder sucked by the suction section 153. The dust collector 1 has a housing 3, a dust collecting bag 4, a supply section 5 that supplies powder to the dust collecting bag 4, a negative pressure generating section 6, and a vibration applying section 7.

The housing 3 houses the dust collecting bag 4 and the vibration applying section 7 therein. The housing 3 has a supply port 31 and a discharge port 32 that are formed of openings. The pipe 244 is inserted to the supply port 31, and an end portion of the pipe 244 is coupled to the dust collecting bag 4. The negative pressure generating section 6 is coupled to the discharge port 32 in an airtight manner.

The dust collecting bag 4 is a mesh-like bag body having air permeability. The dust collecting bag 4 has openings of a size that does not allow passage of the powder. The dust collecting bag 4 has a supply port 40 to which the pipe 244 is coupled. The powder is supplied, with air, into the dust collecting bag 4 via the supply port 40.

The dust collecting bag 4 is flexible, and is inflated in a state where the powder is supplied, with air, in the dust collecting bag 4. The inflated state is restricted by a vibration transmission member 72 (described later) of the vibration applying section 7, and the dust collecting bag 4 has a substantially cubic shape at the limit as shown in the figure.

The pipe 244, the blower 262, and the suction section 153 constitute the supply section 5 that supplies powder.

Such a dust collecting bag 4 may be a woven fabric or a non-woven fabric.

The negative pressure generating section 6 has a function of generating a negative pressure in the housing 3. The negative pressure generating section 6 has, for example, a negative pressure generating source 61 such as a pump that sucks air, and a pipe 62 that couples the negative pressure generating source 61 and the discharge port 32 to each other. By the operation of the negative pressure generating source 61, the air in the housing 3 is sucked via the pipe 62, and a negative pressure is generated in the housing 3.

Thereby, the air together with the powder flows in from the pipe 244, and the inflow air flows out of the dust collecting bag 4 and is discharged from the discharge port 32. That is, an air flow entering from the pipe 244 and discharged from the discharge port 32 through the inside of the dust collecting bag 4 can be generated. The powder is trapped in the dust collecting bag 4 while the air flow passes through the dust collecting bag 4.

The vibration applying section 7 has a vibration source 71 and a vibration transmission member 72.

For example, the vibration source 71 has a drive source 711 such as a motor, and a contactor 712 that contacts with and separates from a top plate 721 of the vibration transmission member 72 by the operation of the drive source 711.

It is desirable that the number of times of the contactor 712 contacts with the top plate 721 per minute is 10 times or more and 500 times or less. The pattern in which the contactor 712 contacts with the top plate 721 may be constant or irregular. The vibration source 71 may be composed of a vibrator or the like.

As shown in FIG. 4, the vibration transmission member 72 is a box-shaped frame that houses the dust collecting bag 4 therein. The vibration transmission member 72 has an insertion hole 70 through which the pipe 244 is inserted. As shown in FIG. 3, the vibration transmission member 72 is configured by a hexahedron formed by assembling six net-like bodies of which rigid wires are installed in a grid shape. The vibration transmission member 72 is installed in the housing 3 via a frame-shaped spacer.

In the following description, a net-like body on the +z axis side is referred to as the top plate 721, a net-like body on the −z axis side is referred to as a bottom plate 722, a net-like body on the +x axis side, in which the insertion hole 70 is formed, is referred to as a side wall 723A, a net-like body on the −x axis side is referred to as a side wall 723B, a net-like body on the +y axis side is referred to as a side wall 723C, and a net-like body on the −y axis side is referred to as a side wall 723D.

As described above, the vibration applying section 7 has the vibration source 71, and the vibration transmission member 72 that transmits vibration generated by the vibration source 71 to the dust collecting bag 4. Thereby, the vibration source 71 generates vibration, and the vibration transmission member 72 can transmit the vibration to the dust collecting bag 4. Therefore, the powder stuck to the inner surface of the dust collecting bag 4 can be struck down onto a bottom surface 42 side, and the occurrence of clogging in the dust collecting bag 4 can be suppressed.

Further, as described above, since the vibration transmission member 72 has a frame in contact with the dust collecting bag 4, the inflating limit of the dust collecting bag 4 is restricted so as to surround the dust collecting bag 4 and the dust collecting bag 4 can be maintained in a desired shape.

The number of wires of the top plate 721 is larger than the number of wires of each of the bottom plate 722, the side wall 723A, the side wall 723B, and the side wall 723C. Thereby, the vibration transmitted to the top plate 721 can be made larger than that transmitted to other parts.

Here, the dust collecting bag 4 has a top surface 41, the bottom surface 42, and a side surface 43 coupling the top surface 41 and the bottom surface 42 in the state where the inflating limit is restricted by the vibration transmission member 72. The side surface 43 has four surfaces. The first surface is a coupling surface 43A that is located on the +x axis side, that is provided with the supply port 40, and to which the pipe 244 is coupled. The remaining three surfaces are a side surface 43B located on the −x axis side, a side surface 43C located on the +y axis side, and a side surface 43D located on the −y axis side.

The top surface 41 is in contact with the top plate 721, the bottom surface 42 is in contact with the bottom plate 722, the coupling surface 43A is in contact with the side wall 723A, the side surface 43B is in contact with the side wall 723B, the side surface 43C is in contact with the side wall 723C, and the side surface 43D is in contact with the side wall 723D.

The vibration source 71 is installed on the top surface 41 side, that is, the top plate 721 side, and is configured to apply vibration to the top plate 721. The vibration applied to the top plate 721 is applied to the bottom plate 722 via the side walls 723A to 723D. In this case, since the vibration is attenuated in the process of transmitting the vibration to the bottom plate 722, the vibration applied to the bottom plate 722 is weaker than the vibration applied to the top plate 721, that is, becomes smaller. Therefore, the vibration transmitted to the bottom surface 42 of the dust collecting bag 4 is smaller than the vibration transmitted to the top surface 41.

Thus, the following effects can be obtained by applying a relatively large, that is, strong vibration, to the top surface 41 of the dust collecting bag 4 and applying a relatively small, that is, weak vibration, to the bottom surface 42.

In particular, when clogging occurs in the top surface 41, pressure loss is likely to occur in the entire dust collecting bag 4, and therefore, by applying a relatively large vibration to the top surface 41, it is possible to make it difficult for pressure loss to occur in the entire dust collecting bag.

Further, by striking down the powder stuck on the top surface 41, the powder rising in the dust collecting bag 4 can also be deposited on the bottom surface 42 side. Therefore, the possibility that the powder sticks to the inner surface can be further reduced.

Then, by applying a relatively weak vibration to the bottom surface 42, it is possible to prevent or inhibit the powder deposited near the bottom surface 42 from rising, and to further reduce the possibility that the powder sticks to the inner surface.

From the above description, in the dust collector 1, it is possible to prevent or suppress the occurrence of pressure loss due to the powder sticking to the top surface 41, the coupling surface 43A, and the side surfaces 43B to 43D. As a result, the amount that can be trapped by the dust collecting bag 4 can be increased as much as possible, and the powder can be stably collected over a long period of time.

As shown in FIG. 3, a member in which the top plate 721 and the side wall 723B are integrally formed and a member in which the bottom plate 722, the side wall 723A, the side wall 723C, and the side wall 723D are integrally formed are provided, and the vibration transmission member 72 is an assembly in which these two members are assembled. In other words, the vibration transmission member 72 has a first portion 72A in which the top plate 721 and the side wall 723B are integrally formed, and a second portion 72B in which the bottom plate 722, the side wall 723A, the side wall 723C, and the side wall 723D are integrally formed.

As described above, the vibration transmission member 72 has the first portion 72A in contact with the top surface 41, and the second portion 72B configured separately from the first portion 72A and in contact with the surfaces other than the top surface 41, that is, the bottom surface 42, the coupling surface 43A, the side surface 43C, and the side surface 43D. Thereby, since the vibration generated by the vibration source 71 is directly transmitted to the first portion 72A, the vibration applied to the top surface 41 can be made relatively large. Meanwhile, since vibration is transmitted to the second portion 72B in contact with the bottom surface 42 via the first portion 72A that is a separate member, the vibration transmitted to the second portion 72B is smaller than the vibration transmitted to the first portion 72A. Thereby, the above effect can be more remarkably exhibited.

Since the vibration transmission member 72 includes the first portion 72A and the second portion 72B that are separate from each other, the vibration applying section 7 applies vibration so that the vibration transmitted to the top surface 41 is larger than the vibration transmitted to the coupling surface 43A. As shown in FIG. 2, since the powder is likely to be deposited on the coupling surface 43A side, when a relatively strong vibration is applied to the coupling surface 43A side, the powder may rise, but the rising of the powder can be prevented or suppressed. Thereby, the above effect can be more remarkably exhibited.

Further, the vibration transmission member 72 is suspended from the top plate of the housing 3 via a plurality of first elastic members 8, and is supported via a second elastic member 9 from the bottom plate side of the housing 3. Thereby, the vibration transmitted to the vibration transmission member 72 can be amplified, and the effect of the present disclosure can be more remarkably obtained.

The installation location and the number of installations of the first elastic member 8 and the second elastic member 9 are not particularly limited. However, it is desirable that they are in contact with corners of the vibration transmission member 72. The first elastic member 8 and the second elastic member 9 are not particularly limited as long as they have elasticity such as rubber and spring.

As described above, the dust collector 1 includes the housing 3, the dust collecting bag 4 that is installed in the housing 3 and having air permeability, the supply section 5 that has the pipe 244 coupled to the dust collecting bag 4 and supplies powder, the negative pressure generating section 6 that generates a negative pressure in the housing 3, and the vibration applying section 7 that applies vibration to the dust collecting bag 4. The dust collecting bag 4 has the top surface 41, the bottom surface 42, and the side surface 43 coupling the top surface 41 and the bottom surface 42. The vibration transmitted to the top surface 41 is larger than the vibration transmitted to the bottom surface 42. Thereby, the powder rising in the dust collecting bag 4 can also be deposited on the bottom surface 42 while suppressing the pressure loss of the top surface 41 at which, when clogging occurs, pressure loss is likely to occur in the entire dust collecting bag 4. Further, by applying a relatively weak vibration to the bottom surface 42, it is possible to prevent or inhibit the powder deposited near the bottom surface 42 from rising, and to further reduce the possibility that the powder sticks to the inner surface. As a result, the amount that can be trapped by the dust collecting bag 4 can be increased as much as possible, and the powder can be stably collected over a long period of time.

The coupling surface 43A and the side surfaces 43B to 43D may be one continuous surface, or two or three of these four surfaces may be continuous. Further, the vibration transmission member 72 may have the same shape according to the shape of the dust collecting bag 4.

Embodiment 2

Figure 5:
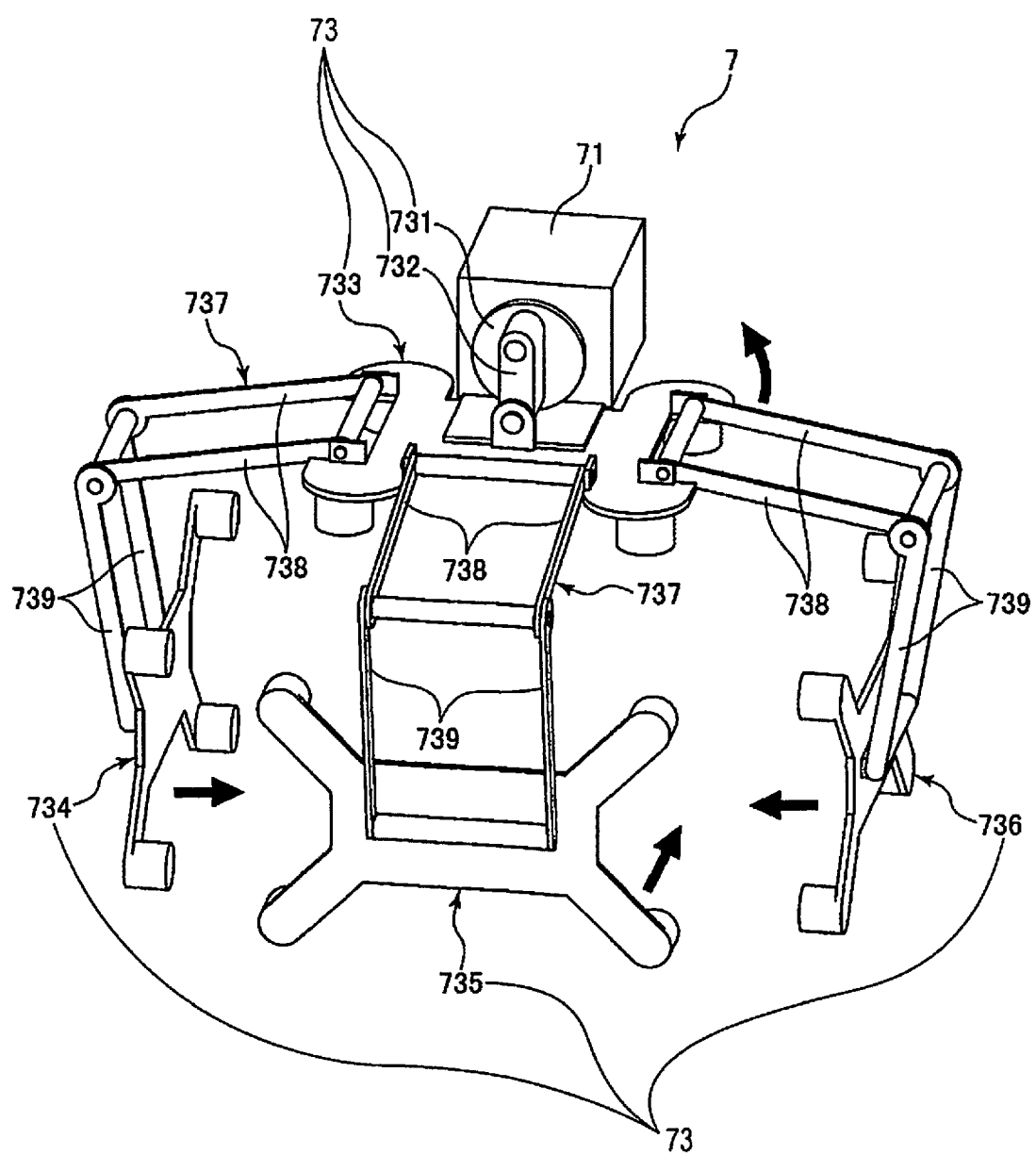
FIG. 5 is a perspective view of a vibration transmission member of a dust collector according to Embodiment 2 of the present disclosure.
Figure 6:
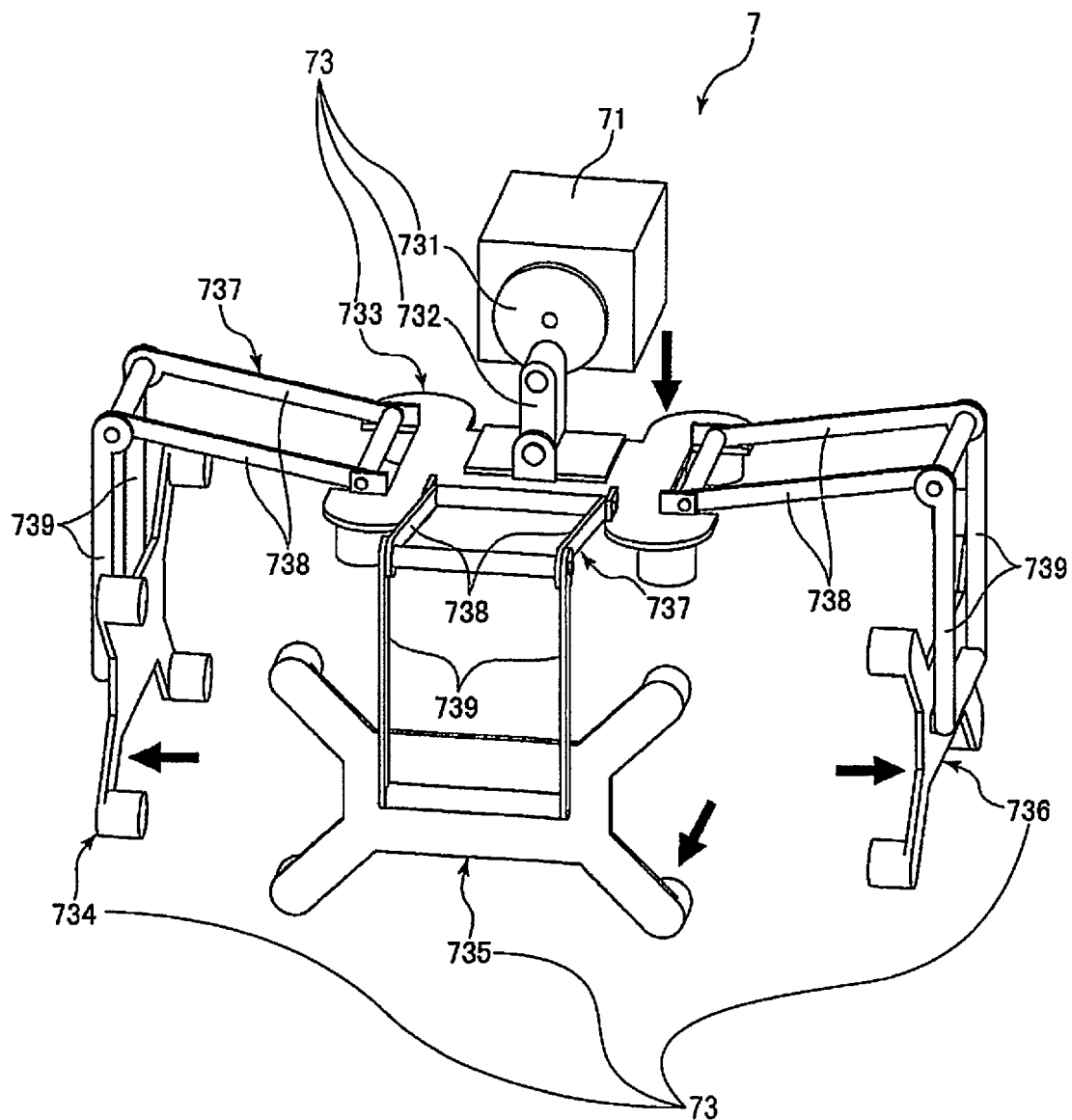
FIG. 6 is a perspective view of the vibration transmission member of the dust collector according to Embodiment 2 of the present disclosure.

FIGS. 5 and 6 are perspective views of a vibration transmission member of a dust collector according to Embodiment 2 of the present disclosure.

The dust collector according to Embodiment 2 of the present disclosure will be described below with reference to FIGS. 5 and 6, but the description will focus on the differences from the above-described embodiment, and the description of the same matters will not be repeated.

The present embodiment is the same as Embodiment 1 except that the configuration of the vibration applying section is different.

As shown in FIGS. 5 and 6, a vibration source 71 is a motor that rotates the core. A vibration transmission member 73 has a rotating table 731 connected to the core of the vibration source 71, a connecting bar 732 connected to the rotating table 731, a first contact member 733 connected to the connecting bar 732, and a second contact member 734, a third contact member 735, and a fourth contact member 736 that are connected to the first contact member 733.

The first contact member 733 repeatedly contacts and separates from a top plate 721 to strike the top plate 721, and mainly applies vibration to a top surface 41 via the top plate 721.

The second contact member 734 repeatedly contacts and separates from a side wall 723C to strike the side wall 723C, and mainly applies vibration to a side surface 43C via the side wall 723C.

The third contact member 735 repeatedly contacts and separates from a side wall 723B to strike the side wall 723B, and mainly applies vibration to a side surface 43B via the side wall 723B.

The fourth contact member 736 repeatedly contacts and separates from a side wall 723D to strike the side wall 723D, and mainly applies vibration to a side surface 43D via the side wall 723D.

Each of the first contact member 733, the second contact member 734, the third contact member 735, and the fourth contact member 736 has four protrusions, and these four protrusions contact the dust collecting bag 4.

The first contact member 733 and the second contact member 734, the first contact member 733 and the third contact member 735, and the first contact member 733 and the fourth contact member 736 are respectively connected to each other via a connecting member 737. The connecting member 737 has a first connecting member 738 extending along the horizontal direction and a second connecting member 739 extending along the vertical direction, and these connecting members are rotatable via a hinge. In addition, the hinge portion is fixed to a housing 3.

In the present embodiment, the rotating table 731 is rotated by the operation of the vibration source 71 and the position of the connecting bar 732 is displaced in the vertical direction. Due to the displacement, the first contact member 733 is displaced in the vertical direction. Then, the second contact member 734, the third contact member 735, and the fourth contact member 736 connected by the connecting member 737 are displaced in the horizontal direction in accordance with the displacement of the first contact member 733. Therefore, the state, as shown in FIG. 5, where the first contact member 733 is separated from the top plate 721, and the second contact member 734, the third contact member 735, and the fourth contact member 736 contact the dust collecting bag 4, and the state, as shown in FIG. 6, where the first contact member 733 contacts the top plate 721, and the second contact member 734, the third contact member 735, and the fourth contact member 736 are separated from the dust collecting bag 4 can be obtained. In addition, these states can be alternately repeated.

Thus, the vibration transmission member 73 has the first contact member 733, which is a third portion that applies vibration by repeating approach and separation with respect to the top surface 41, and the second contact member 734, the third contact member 735, and the fourth contact member 736, which are fourth portions that apply vibration by repeating approach and separation with respect to the side surfaces, which are surfaces other than the top surface 41. Even in the present embodiment, since it is configured not to directly strike the bottom surface 42, the same effect as Embodiment 1 described above can be obtained. In addition, since there are many striking points, clogging can be more effectively prevented or suppressed.

The first contact member 733 that is the third portion, the second contact member 734 that is the fourth portion, the third contact member 735 that is the fourth portion, and the fourth contact member 736 that is the fourth portion repeat contact and separation at different timings. Thereby, vibration can be alternately applied to the dust collecting bag 4, and clogging can be more effectively prevented or suppressed.

The first contact member 733 that is the third portion repeats contact and separation. The second contact member 734 that is the fourth portion, the third contact member 735 that is the fourth portion, and the fourth contact member 736 that is the fourth portion repeat contact and separation at the same timing. The timing of contact and separation between the third portion and the fourth portion may be reversed. Thereby, vibration can be alternately applied to the direction in which the dust collecting bag 4 is disposed, and clogging can be more effectively prevented or suppressed.

In the present embodiment, it is configured to strike the vibration transmission member 72, but the vibration transmission member 72 may be omitted and the dust collecting bag 4 may be directly struck.

The movable amount, that is, the stroke of the first contact member 733, the second contact member 734, the third contact member 735, and the fourth contact member 736 may be the same or different. However, it is desirable that the stroke of the first contact member 733 is larger than those of the second contact member 734, the third contact member 735, and the fourth contact member 736.

Hereinbefore, the dust collector according to the present disclosure has been described with reference to the illustrated embodiment, but the present disclosure is not limited thereto and each section constituting the dust collector can be replaced with any section that can implement the same function. Further, any components may be added.

The dust collector of the present disclosure may be a combination of any two or more configurations or features of the above embodiment.

In each of the above embodiments, the case where the dust collector 1 is installed for collecting the powder sucked by the suction section 153 has been described, but the dust collector 1 may be installed for collecting the powder sucked by the suction section 193.

What is claimed is:
1. A dust collector comprising:
a housing;
a dust collecting bag that is installed in the housing and has an air permeability;
a supply section that has a pipe coupled to the dust collecting bag, and supplies a powder into the housing via the pipe;
a negative pressure generating section that generates a negative pressure in the housing; and
a vibration applying section that applies a vibration to the dust collecting bag, wherein
the dust collecting bag includes a top surface, a bottom surface, and a side surface coupling the top surface and the bottom surface with each other,
a vibration transmitted to the top surface is larger than a vibration transmitted to the bottom surface,
the side surface includes a coupling surface to which the pipe is coupled, and
a vibration transmitted to the top surface is larger than a vibration transmitted to the coupling surface.
2. The dust collector according to claim 1, wherein
the vibration applying section includes a vibration source, and a vibration transmission member that transmits a vibration generated by the vibration source to the dust collecting bag.
3. The dust collector according to claim 2, wherein
the vibration source is installed at the top surface.
4. The dust collector according to claim 2, wherein
the vibration transmission member includes a frame in contact with the dust collecting bag.
5. The dust collector according to claim 2, wherein
the vibration transmission member includes a first portion in contact with the top surface, and a second portion configured separately from the first portion and in contact with the side surface.
6. A dust collector comprising:
a housing;
a dust collecting bag that is installed in the housing and has an air permeability;
a supply section that has a pipe coupled to the dust collecting bag, and supplies a powder into the housing via the pipe;
a negative pressure generating section that generates a negative pressure in the housing; and
a vibration applying section that applies a vibration to the dust collecting bag, wherein
the dust collecting bag includes a top surface, a bottom surface, and a side surface coupling the top surface and the bottom surface with each other,
a vibration transmitted to the top surface is larger than a vibration transmitted to the bottom surface,
the vibration applying section includes a vibration source, and a vibration transmission member that transmits a vibration generated by the vibration source to the dust collecting bag, and
the vibration transmission member includes a third portion that applies a vibration by repeating approach/separation to/from the top surface, and a fourth portion that applies a vibration by repeating approach/separation to/from a surface other than the top surface.
7. The dust collector according to claim 6, wherein
the third portion and the fourth portion repeat contact/separation at different timings.

8. The dust collector according to claim 7, wherein the third portion and the fourth portion repeat contact/separation at opposite timings.

\* \* \* \* \*